April 26, 1966   W. H. PHELPS   3,247,656
BLADE FOR ROTARY MOWERS
Filed Jan. 23, 1964   2 Sheets-Sheet 1

Inventor:
William H. Phelps
By: Hofgren, Wegner, Allen,
Stellman & McCord
Attorneys April 26, 1966     W. H. PHELPS     3,247,656
BLADE FOR ROTARY MOWERS
Filed Jan. 23, 1964             2 Sheets-Sheet 2
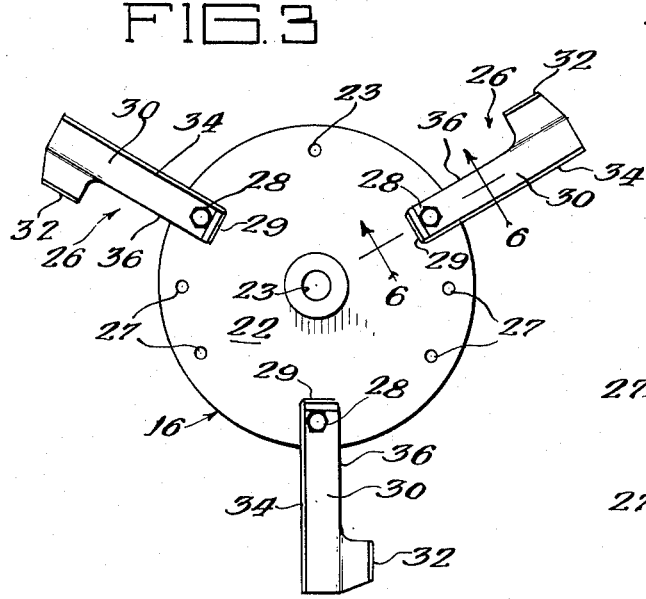
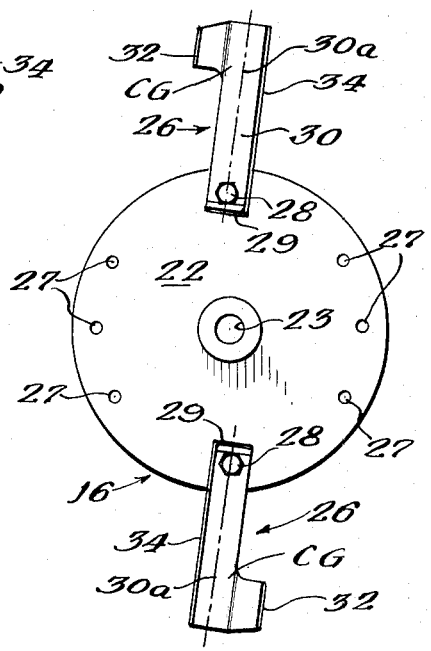
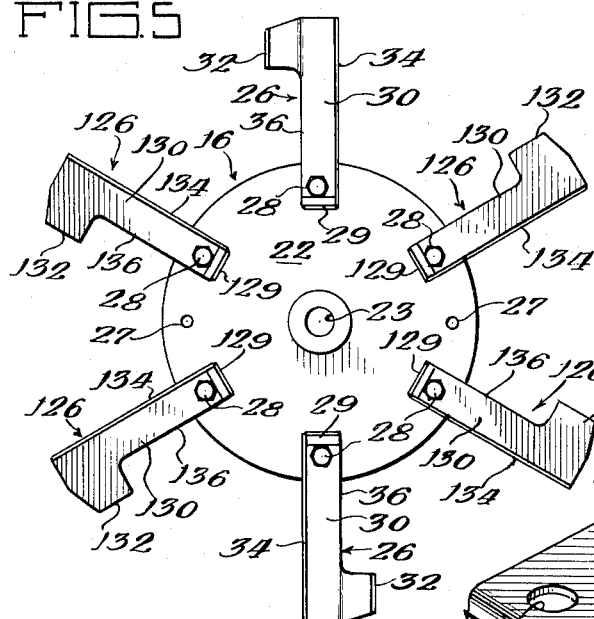
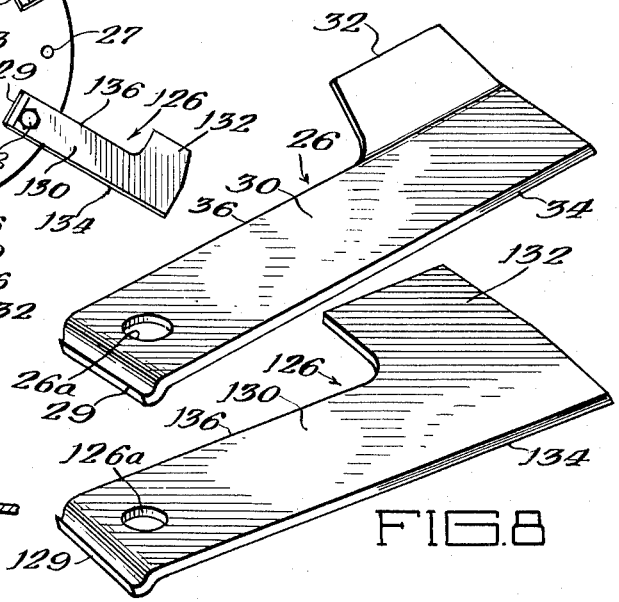
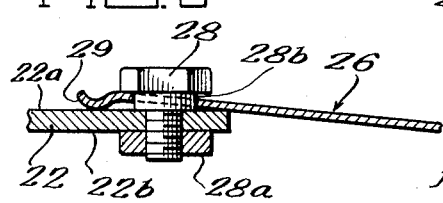

United States Patent Office 3,247,656
Patented Apr. 26, 1966

3,247,656
BLADE FOR ROTARY MOWERS
William Howard Phelps, 7577 Burlington St.,
Ralston, Nebr.
Filed Jan. 23, 1964, Ser. No. 339,690
1 Claim. (Cl. 56—295)

This invention relates to rotary mowers and more particularly to a new and improved cutting blade therefor.

In the art of lawn mowing it has long been a problem to adequately mow a stand of grass which is relatively wet. Also, extremely lush grass, such as rye grass, which is used for wintertime lawns in the warmer areas, is rather difficult to mow. In either case, difficulties are encountered in clogging the underside of the housing of the rotary mower as well as the exhaust chute thereof.

In those rotary mowers which utilize a series of individual blades mounted on a separate disc, the blades are usually secured thereto by appropriate bolt and nut fasteners. Typically, the blade is mounted to the top of the disc with one end of the fastener extending therebelow. As the disc rotates, that portion of the nut and bolt fastener which is below the disc will strike the grass being mowed at a lower level than the blades secured to the disc. In so doing, the grass tips are split. The result of this is that the tips become brown and die, so that for a period of time after the mowing the lawn loses some of its abundant color due to the brown split tips on the grass.

It is therefore a general object of this invention to provide a new and improved rotary mower having blade means permitting more effective cutting of wet or lush grass which accomplishes this improved mowing action without splitting the grass tips cut thereby.

It is another object of this invention to provide a new and improved blade for a rotary mower having a blade bearing cutting disc, wherein the blade is adapted to flex in a vertical plane in response to forces received thereon during rotation of the disc.

It is still another object of this invention to provide a new and improved cutting blade for a rotary mower having a blade bearing disc wherein the blade is adapted to move in the plane of the disc to advance the cutting edge of the blade ahead of the radius of attachment of the blade to direct grass being cut thereby inwardly toward the center of the disc.

Other objects of this invention will be apparent from the following description and from the drawings, in which:

FIGURE 3 is a top plan view of the disc and blade assembly of this invention;

FIGURE 4 is a view similar to FIGURE 3 showing a different blade mounting arrangement;

FIGURE 5 is also a view similar to FIGURE 3 showing another form of blade arrangement;

FIGURE 6 is an enlarged fragmentary section view taken along the line 6—6 of FIGURE 3 illustrating the means of mounting the blade to the disc;

FIGURE 7 is a perspective view of a cutting blade of this invention; and

FIGURE 8 is a perspective view of a modified form of the blade of this invention.

Figure 1:
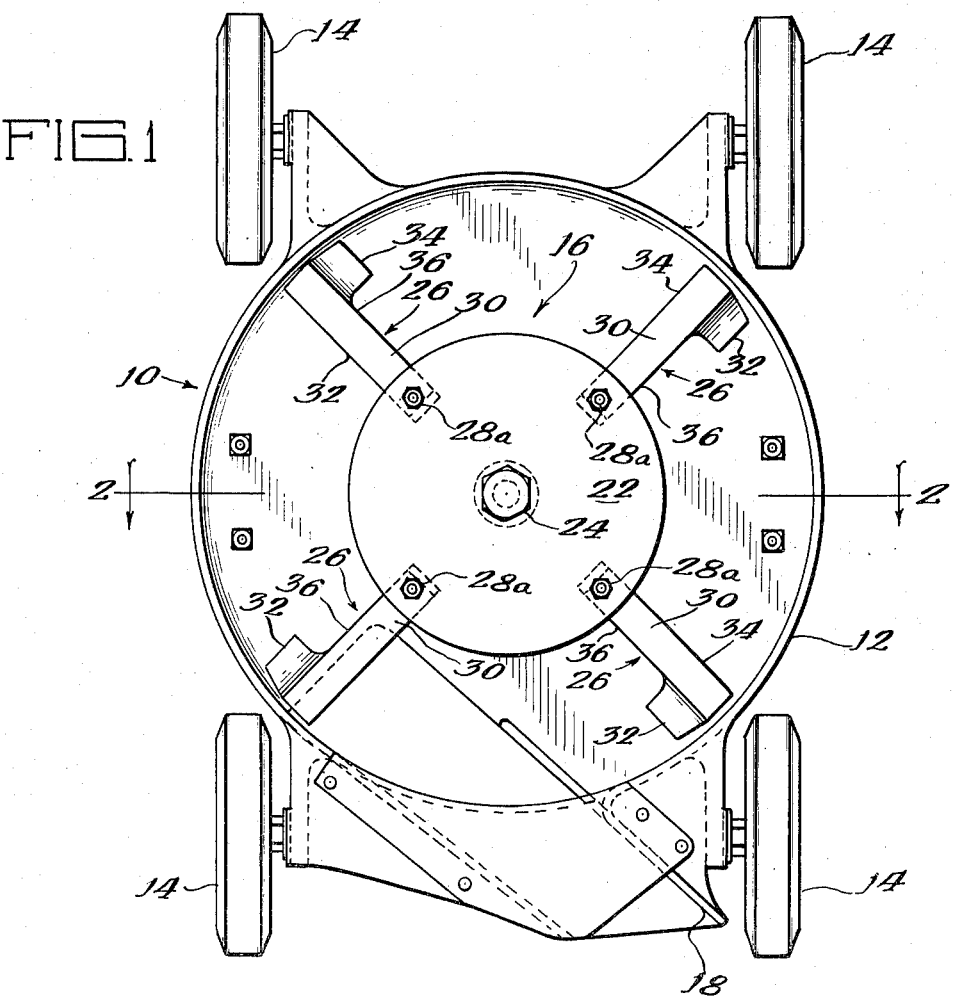
FIGURE 1 is a bottom plan view of a rotary mower embodying the blade of this invention.
Figure 2:
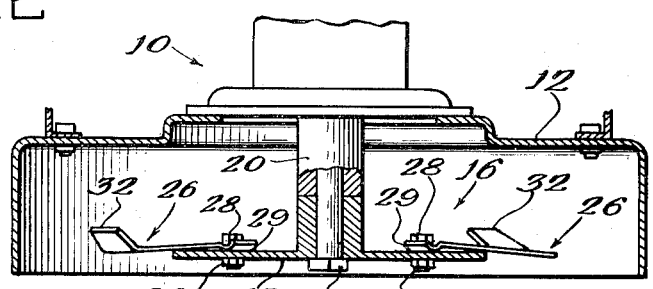
FIGURE 2 is a fragmentary section view of the rotary mower of FIGURE 1 taken along the line 2—2 thereof.

While this invention is susceptible of embodiment in many different forms, there is shown in the drawings and will herein be described in detail a specific embodiment thereof, with the understanding that the present disclosure is to be considered as an exemplification of the principles of the invention and is not intended to limit the invention to the embodiment illustrated.

Referring now to the drawings, in FIGURE 1 there is shown a rotary mower 10 having a housing 12 to which wheels 14 are attached for supporting the housing above the ground and providing a means for transversing the same relative to the ground. The housing 12 is of the well known cap-like configuration to adequately enclose a blade assembly 16 therein. An outfeed chute 18 is provided through which the cut grass may be expelled. A well known power means, such as an internal combustion engine (not shown), is provided for rotating a drive shaft 20 to which a disc 22 is secured by means, such as a bolt 24.

Attached to the disc at selected points near the periphery thereof are a plurality of flexible blades 26. The blades have openings 26a at one end thereof which are placed in registry with openings 27 about the periphery of the disc and through which suitable fastening means, such as bolts 28, are inserted and threaded to nuts 28a for securing the blades to the disc. FIGURES 3, 4 and 5 show that the portion of the blade 26 which extends outwardly from the margin 22a of the disc 22 is slightly shorter than the radius of the disc so that, in a conventional rotary mower which cuts a 21-inch swath, the disc is about 11 inches and the extending part of the blade is about 10 inches, or about one-half the swath of the blade.

The underside of the bolt is provided with a shoulder 28b and the end of the blade near the opening 26a is provided with a transversely extending rib 29. The rib 29 cants the blade relative to the plane of the disc and the shoulder 28b limits the axial movement of the bolt so that the blade is held firmly in the canted position shown but is free to pivot relative to the bolt 28. Thus the blade is free to move in a direction opposite to the rotation of the disc in response to striking certain objects, or is free to move in the direction of rotation of the disc in response to the centrifugal force exerted on an offset center of gravity of the blade as will be explained.

The blade 26 is provided with a geerally flat elongated body portion 30 and is secured to the disc at a point along the longitudinal axis 30a of the body and near the bent rib 29 thereof. The outer, or free end of the relatively flat elongated body has a short inclined upstanding ear, or air foil 32 on its trailing edge, while the leading edge of the blade, opposite the air foil 32, is a sharp cutting edge 34 and the trailing edge 36 is relatively dull. As seen in the drawings, the air foil is only about ⅓ the length of the blade, and therefore does not serve to stiffen the blade materially. As the disc rotates and drives the blade, the mass of air striking the air foil 32 will cause the blade to be flexed downwardly. This will position the free end of the blade at a point below the plane of the disc 22 and the bottom line of the nut 28a so that the blade may cut the free ends of the grass at a point below which the nut 28 cannot strike the grass and split the ends thereof.

Because of the upstanding air foil 32, the center of mass of the blade is at a point above the plane of the inner end of the blade where the blade is fastened to the fly wheel. As the fly wheel rotates, centrifugal force attempts to locate the center of mass of the blade in the plane of the inner end of the blade. Experimentation has proved that, for any given height, weight and shape of air foil, about 70 percent of the deflection is due to the upwardly offset center of mass and about 30 percent is blade flexure resulting from air striking the air foil. This was experimentally demonstrated by taking a flat blade, such as the blade 126, and welding to its outer end an upstanding fin of height and weight about equal to that of the air foil 32, but oriented to pass edgewise through the air instead of flatwise, so as to substantially eliminate the air deflection effect. The experimental blade deflected about 70 percent as much as did a blade 26 having an air foil 32.

A second mulching blade 126 of generally flat planar configuration may also be used in combination with the cutting blades 26. The blades 126 are provided with a rearwardly extending portion 132 which lies in the plane of the body 130. The blade is provided with a leading cutting edge 134 and a trailing edge 136. An opening 126a is provided on the interior end of the blade for mounting the blade to the disc. A transversely extending rib 129 is also provided and serves the same function as the rib 29, that of mounting the blade at a slight angle relative to the disc. When the disc is rotated and the cutting blades deflect downwardly to cut in a swath below the plane of the nuts 28a, the mulching blades 126, having no air foil, and no weight above the plane of the blade, will not deflect and therefore will cut a swath through a plane above that of the cutting blades. The grass clippings cut by the cutting blades will be deflected into the plane of the mulching blades and be subjected to additional cutting or mulching to produce finer grass clippings. This permits more grass clippings to be received by a grass catcher as well as giving an improved cutting action in relatively high grass and/or wet grass.

Those blades 126 provided with the rearwardly extending portion 132, which lies in the plane of the body 30, as well as those blades 26 provided with the inclined air foil 32, have a center of gravity near the free end of the blade and on the side of the longitudinal blade axis opposite from the cutting edge 34. As the shaft is driven to rotate the blades with the cutting edges leading, the resultant centrifugal force will cause each blade to pivot slightly relative to its respective mounting on the disc to a working position wherein the center of gravity of each blade is on a radial line through its mounting on the disc. Both the longitudinal axis and the cutting edge of the blade are therefore at a small angle forward of a radius through the mounting means. Such angular position is herein defined as a positive rake angle. This angle of the cutting blade relative to the radius of the disc causes the blades to gather vegetation, such as grass, and direct it toward the disc. FIGURE 4 illustrates the position of the blades in this working position and the point marked "CG" represents the approximate center of gravity thereof which can be seen to be on a radial line through the mounting of the blades to the disc. This positive rake angle gives an improved cutting action as compared with what can be obtained with a blade having its cutting edge parallel to a radius from the shaft or at a negative rake angle.

Preferably, the blades of this invention are of steel which has been heat treated to a Rockwell C scale of between 41 and 45. The steel is relatively thin and in the preferred embodiment a blade of U.S. standard 15 gauge is used, so that the unsupported portion of the blade can flex freely. The pivotal positive rake angle afforded by the blade of this invention allows the blade to yield rearwardly in response to striking hard objects so as to minimize blade damage. However, the mounting of the blade to the disc is sufficiently tight so that under normal circumstances the blade will remain in its radially extending position and advance to the working position only in response to the rotation of the disc.

It has been found that extremely wet or lush grass may be cut very easily with the blade assembly 16 shown in FIGURE 3. For example, the blade was used on a lawn flooded with one inch of water and was set to mow the grass at the one inch level. It was found that the blade structure as shown in FIGURE 3 ejected the grass clippings into a grass catcher and cut the grass ideally under such a condition. The underside of the machine was not clogged. The same successful result was obtained when this structure was used to cut the extremely lush rye grass.

The structure shown in FIGURE 5 provides two air foil type blades 26 with four flat blades 126. The flat blades tend to extend outward more nearly horizontal during rotation to fan through a plane above the air foil blade. Thus there are two air foil blades cutting downwardly and four blades operating at a different plane thereabove to act as chopping blades to mulch the grass clippings. With this type of structure it has been found that more grass clippings may be put into a grass catcher due to the mulching action. Also, higher grass with longer clippings may be cut more easily and smoothly.

The blade of this invention provides an improved mowing action not previously known. The air foil construction permits the blade to flex to a point below the plane of the cutting disc so that it mows the grass at a level lower than the protruding fastening means. This eliminates the possibility of split grass tips caused by the blunt nuts or bolts striking the end of grass tips and eliminates the brown grass tips caused thereby to provide a more lush appearing green lawn. This type of blade also gives improved cutting action in wet grass. Moreover, it has been found that by merely increasing the number of air foil blades on the disc the mower engine may be run at a much lower r.p.m., thus prolonging engine life. The addition of the flat blades in combination with the air foil blades provide a blade assembly which can cut longer grass and break up the grass clippings so that more grass clippings can be received by the grass catcher before it has to be emptied. Finally, the offset center of gravity of the blades in relation to the radius of mounting thereof causes the blades to pivot to a working position with the center of gravity of the blades on a radial line through its mounting means to advance the blades to a working position wherein the cutting edge of each blade has a positive rake angle with relation to the disc to gather vegetation and direct the same toward the disc.

I claim:

In a lawn mower having an upright shaft and means for driving the shaft at high speed, in combination: a disc keyed on the lower end of said shaft; a plurality of substantially planar mulching blades mounted generally radially against the top surface of the periphery of said disc; a plurality of thin, elongate cutting blades of flexible steel extending generally radially from the periphery of said disc between said mulching blades and each occupying at least about one-half the radius of the mower, each of said cutting blades having a leading cutting edge and a trailing edge; fastening means at the extreme inner end portion of each cutting blade securing said blade against the top surface of the periphery of the disc for pivotal movement in a horizontal plane and fixing the inner end of said blade against movement in any other plane; upturned air foil means at the outer extremity of each cutting blade trailing edge constructed to create a strong updraft of air as said shaft is driven to rotate said blades at high speed, each said air foil means occupying only a minor proportion of the length of the cutting blade so that the cutting blade may flex freely, the thickness of each of said cutting blades being so small that high speed rotation of the shaft causes the cutting blades to flex a substantial distance vertically and thus permit the cutting edges near the outer ends of said cutting blades to cut in a plane below the plane of said disc while said effectively rigid mulching blades will intersect the grass clippings cut by said cutting blades in a plane vertically offset from the plane of said cutting blades to mulch said clippings.

References Cited by the Examiner

UNITED STATES PATENTS 2,167,222    7/1939    Shelor _____ 56—295 X (Other references on following page)

UNITED STATES PATENTS

| | | | |
|---|---|---|---|
| 2,484,511 | 10/1949 | Ingalls | 56—295 |
| 2,654,986 | 10/1953 | Gold | 56—295 |
| 2,669,084 | 2/1954 | Warren | 56—295 |
| 2,697,323 | 12/1954 | Horn | 56—295 |
| 2,751,737 | 6/1956 | Herod. | |
| 2,815,631 | 12/1957 | Northcote et al. | |
| 2,998,689 | 9/1961 | Boesch | 56—25.4 |
| 3,053,033 | 9/1962 | Maguire | 56—295 |

FOREIGN PATENTS 237,877  3/1962  Australia.

ABRAHAM G. STONE, *Primary Examiner.*

RUSSELL R. KINSEY, ANTONIO F. GUIDA,
*Examiners.*